United States Patent
Fiter et al.

(10) Patent No.: US 7,545,806 B2
(45) Date of Patent: Jun. 9, 2009

(54) METHOD FOR LOGGING AN END TERMINAL IN A PACKET DATA NETWORK

(75) Inventors: Bruno Fiter, Lannion (FR); Notker Gerlich, Haar (DE)

(73) Assignee: Siemens Aktiengesellschaft, Munich (DE)

( * ) Notice: Subject to any disclaimer, the term of this patent is extended or adjusted under 35 U.S.C. 154(b) by 726 days.

(21) Appl. No.: 10/380,771

(22) PCT Filed: Sep. 13, 2001

(86) PCT No.: PCT/DE01/03522

§ 371 (c)(1),
(2), (4) Date: Mar. 18, 2003

(87) PCT Pub. No.: WO02/25980

PCT Pub. Date: Mar. 28, 2002

(65) Prior Publication Data

US 2004/0022220 A1  Feb. 5, 2004

(30) Foreign Application Priority Data

Sep. 19, 2000  (DE) ................................ 100 46 343

(51) Int. Cl.
*H04L 12/28* (2006.01)
(52) U.S. Cl. ........................ 370/389; 370/328
(58) Field of Classification Search .................. None
See application file for complete search history.

(56) References Cited

U.S. PATENT DOCUMENTS

| | | | | |
|---|---|---|---|---|
| 5,740,160 A | * | 4/1998 | Ikegami et al. | 370/255 |
| 6,469,998 B1 | * | 10/2002 | Burgaleta Salinas et al. | 370/338 |
| 6,636,490 B1 | * | 10/2003 | Johnson | 370/328 |
| 6,671,735 B1 | * | 12/2003 | Bender | 709/238 |
| 6,690,659 B1 | * | 2/2004 | Ahmed et al. | 370/328 |
| 6,947,398 B1 | * | 9/2005 | Ahmed et al. | 370/331 |

FOREIGN PATENT DOCUMENTS

| | | |
|---|---|---|
| EP | 0 483 547 A1 | 5/1992 |
| EP | 1 083 768 A1 | 3/2001 |
| WO | WO 00/21319 | 4/2000 |
| WO | WO 00/51374 | 8/2000 |
| WO | WO 00/76249 | 12/2000 |

OTHER PUBLICATIONS

XP-002203529: "Digital Cellular Telecommunications System"; c. Jul. 2000.
"The Implication of the Next-Generation Wireless Network Design"; c. Jun. 2000.

* cited by examiner

*Primary Examiner*—Bob A Phunkulh
(74) *Attorney, Agent, or Firm*—King & Spalding L.L.P.

(57) ABSTRACT

The invention relates to a method for logging an end terminal in a packet data network (AN), which supports the mobility of terminals. An address for the receipt of data packets is assigned to the terminal (UE) as follows: the terminal (UE) transmits an identification (IMSI) that has been allocated to it to the network (AN), via a mobile radio telephone communication system (PLMN) and the address (NI:IMSI) is then calculated according to a standard method by the terminal (UE) and by the network (AN, RAN), using the identification (IMSI).

5 Claims, 1 Drawing Sheet

METHOD FOR LOGGING AN END TERMINAL IN A PACKET DATA NETWORK

CLAIM FOR PRIORITY

This application claims priority to International Application No. PCT/DE01/03522 which was published in the German language on Sep. 13, 2001.

TECHNICAL FIELD OF THE INVENTION

The invention relates to a method for logging a terminal device in a packet data network which supports the mobility of terminal devices.

BACKGROUND OF THE INVENTION

In order to operate data terminal devices in a packet data network, it is necessary for an address to be assigned to each data terminal device within a network. The address can be attached in each case to data packets transferred over the network in order to enable correct forwarding of the data packets in the network to the intended receiving terminal device. For each connected computer the Internet Protocol Version 4 uses, for example, an address which can be represented as a string of numbers separated by dots, whereby the numbers describe the location of the computer in a hierarchically grouped system in a similar fashion to the digits of the postal code system used by the German Post Office. A hierarchical structure of this type enables a transit node in the network to transport a data packet which is to be forwarded onward in the correct direction without requiring any detailed knowledge of the overall structure of the network in order to do so.

The fact that the addresses in a network of this type reflect the geographical structure of the network results in problems, however, if a terminal device is used at different locations at which it would need to have different addresses as a result of the network structure. Let us assume that a terminal device having the address a1.b1.c1.d1 (where a1.b1.c1.d1 are each natural numbers smaller than 255) is to be operated not by way of its assigned node a1.b1.c1 but at a different location by way of a node a1.b2.c2, then although the terminal device is possibly able to feed data packets into the network, which could also reach their destination, any response from the destination computer to which such a data packet is sent will however be sent by the destination computer to the destination address a1.b1.c1.d1. Since the terminal device is not actually situated at this location, the response will disappear into the void; no communication occurs.

In order to remedy this problem at least in part the mobile IP protocol has been developed. In an adapted form, this protocol is also a component of the Internet Protocol Version 6 standard. This protocol provides that a terminal device is assigned a second address, the so-called care-of address, if it can be logged in the network by way of a node which is not its home node. This care-of address is conveyed to a so-called home agent at the home node of the terminal device. As a result of this the home agent is in a position to intercept data packets intended for the terminal device, in other words those provided with the terminal device's first address, at the home node and to forward them, provided with the care-of address, tunneled to the terminal device at its actual location.

The logging of a terminal device in a packet data network which supports the mobility of terminal devices, such as the mobile IP network mentioned above, involves a considerable signaling requirement which impairs the transport capacity of the network for useful data. On the one hand, when a contact is initiated between the terminal device and the network a free address must be found within the network which can be allocated to the terminal device without any danger of a collision with other terminal devices being operated on the network, while on the other hand this address, once it has been found, must be conveyed to the terminal device in order that the terminal device is able to apply a correct sender's address to packets sent by the terminal device, and the address must be notified to the home agent in order that the home agent is able to correctly forward packets sent to the first address.

This disadvantage is particularly inconvenient if the terminal device is communicating with the packet data network by way of a radio link using a mobile radio network, since in this case transmission bandwidth is scarce—especially for the transmission of information relevant to the functional integrity of the system such as addresses which need to be transmitted with a highly effective level of protection against transmission errors.

SUMMARY OF THE INVENTION

The invention discloses a method which permits the logging of a mobile terminal device in a packet data network with a low signaling requirement.

In one embodiment of the invention, during the logging of a terminal device many communication networks require the terminal device to transmit an identification which identifies the terminal device or the user of the terminal device at least within the network, whereby this identification—particularly in the case of a telecommunications network—can be used in order to be able to assign usage of the network to a user and charge the user for such usage or—more in the case of a computer network—can be used in order to check the authorization of the user to access the network and, where applicable, data sets available therein. This identification is transmitted by the terminal device to the network. The personalizing information included in this identification can therefore, without needing to be transmitted separately, be used in order to calculate an address. Since the calculation is performed in accordance with a standardized method not only by the network but also by the terminal device, both ultimately have at their disposal the same address for the terminal device without this address needing to have been transmitted from the network to the terminal device.

Reversibility of the method is desirable in order to ensure that it is not possible to assign the same address to two terminal devices.

It is preferable if the identification is uniquely allocated to each terminal device during manufacture on a worldwide basis (and not simply within the packet data network, for example), since in that case—within the framework of roaming, for example—the logging of any desired terminal devices which are normally used in a visited network is also possible in the packet data network.

If the terminal device is a mobile terminal device, the IMSI (International Mobile Subscriber Identity) of the terminal device presents itself in particular as an identification.

The address of the terminal device can be formed in an extremely simple manner by concatenating the identification of the terminal device with an identification for the packet data network.

BRIEF DESCRIPTION OF THE INVENTION

An embodiment of the invention will be described in the following with reference to the drawings. In the drawings.

DETAILED DESCRIPTION OF THE INVENTION

Figure 1:
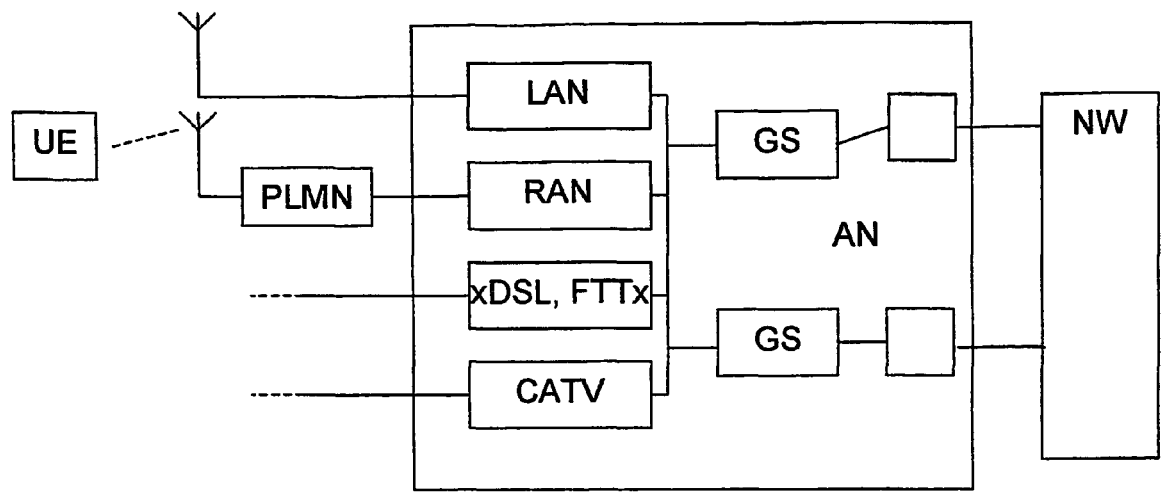
FIG. 1 shows an access network which enables mobile terminal devices to access a network such as the Internet, as an example of a packet data network in which the method according to the invention can be used.

As can be seen from FIG. 1, the access network AN has a plurality of gateway servers GS which can be set up at different locations in a country and each have an interface to a network NW, such as the Internet. The gateway servers GS are independent of one another in respect of their functionality; multiple gateway servers GS are present in order not to let the access paths to the network NW become too long for the individual terminal devices UE.

The Internet is simply one example of a network NW for which the access network AN described here can be applied in respect of its access arrangements. A further application would be, for example, the linking of mobile terminal devices UE belonging to employees of a company to a corporate network NW.

The access network AN includes an IP-based radio access network RAN which supports the linking of terminal devices UE by way of a radio communication system PLMN. Further possible options which are not considered here in detail for linking terminal devices are a wireless LAN, line-connected broadband services such as xDSL, FTTx or broadband cable television CATV.

The radio communication system PLMN has a cellular structure which is generally known from mobile radio standards such as GSM or UMTS and which is not shown in detail in the figure. It includes a plurality of base stations BS which are each assigned to a geographical region referred to as a cell and are able to communicate with terminal devices currently located in the cell. In each such case a base station controller controls a plurality of base stations connected to the controller. The base station controllers are linked to nodes of the radio access network RAN.

Figure 2:
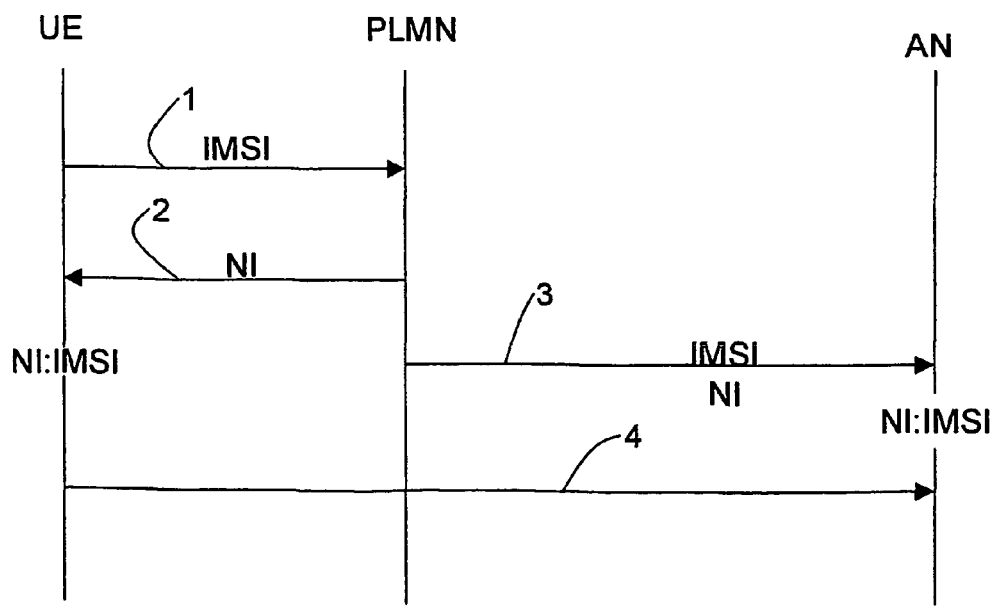
FIG. 2 shows the sequence important messages exchanged between the terminal device and the access network during logging of a terminal device.

FIG. 2 shows a schematic diagram of the logging sequence for a terminal device UE in the radio access network RAN. If the terminal device UE wishes to have itself logged in the radio access network RAN in order to exchange data with the network NW or with other terminal devices connected to the access network, then in order to do so it first logs in on the level of the mobile communication system. The sequence of this log-in procedure is defined in detail for various mobile radio communication standards such as GSM, UMTS etc. and does not therefore require a detailed description here. During the course of this log-in procedure, symbolized in FIG. 2 by the arrow 1, the terminal device UE transmits an identification to the mobile radio communication system PLMN which allows the latter to determine the identity of the terminal device and to check the authorization of the terminal device for using the resources of the mobile radio communication system PLMN. This identification comprises at least the IMSI (International Mobile Subscriber Identity) of the terminal device.

The procedure for logging into the mobile radio communication system PLMN typically also includes the transmission of an identification referred to here as the network identifier NI for the mobile radio communication system to the terminal device UE (arrow 2) which enables the terminal device or its user to recognize which system from a possible plurality of systems available for selection the terminal device is logged in to.

If the identification check has a positive outcome and the terminal device is permitted to use the mobile radio communication system PLMN, and if in addition the mobile radio communication system PLMN determines that the link requested by the terminal device UE is a packet data link by way of the radio access network RAN, then the mobile radio communication system PLMN passes on the identification IMSI sent by the terminal device UE in a message represented by an arrow 3 and also the network identifier NI to the access network RAN.

Both the terminal device UE and the access network RAN thus have knowledge of the two identifications IMSI and NI. Both together, independently of one another, form an address through combining the two identifications to produce a single character string whose first part is the network identifier NI and whose second part is the IMSI. A transmission by radio of the address, which would need complex protection against transmission errors and therefore require the transmission of a quantity of information which far exceeds the actual number of characters in the address, is not required.

Since the IMSI by definition uniquely identifies any mobile radio terminal device existing throughout the world, the address thus generated is necessarily unique. It can therefore be used for the data line in the access network without any check being required as to whether the address is already allocated to another terminal device. The signaling requirement associated with such a check or with the search for an as yet unallocated address is therefore avoided.

The address generated in this way can therefore be used by the terminal device, immediately after it has been generated, as a sender identification for data packets sent by the terminal device to the network NW (symbolized by the arrow 4) or for data packets sent by way of the network NW to the terminal device UE without previously requiring any type of communication over the radio path between terminal device UE and radio access network RAN with regard to the address to be used. The address generation is based exclusively on information whose transmission by radio is in any case required for logging the terminal device in to the mobile radio communication system PLMN.

The invention claimed is:

1. A method for logging a terminal device in a packet data network which supports the mobility of terminal devices, comprising assigning the terminal device an address for receiving data packets, the terminal device transmitting to the network an identification which has been assigned thereto and the address is calculated independently by the terminal device and by the network in accordance with same predetermined method based on the identification thereby the address does not need to be transmitted from the network to the terminal device.

2. The method according to claim 1, wherein the method for calculating the address is reversible.

3. The method according to claim 1, wherein the identification is uniquely allocated to each terminal device during manufacture on a worldwide basis.

4. The method according to claim 1, wherein the terminal device is a mobile radio terminal device, and the identification is an IMSI of the mobile radio terminal device.

5. The method according to claim 1, wherein the address is formed by concatenating the identification of the terminal device with an identification for the packet data network.

* * * * *